United States Patent
Ying

(10) Patent No.: US 9,641,481 B2
(45) Date of Patent: May 2, 2017

(54) SMART CONVERSATION METHOD AND ELECTRONIC DEVICE USING THE SAME

(71) Applicant: HTC Corporation, Taoyuan (TW)

(72) Inventor: Wen-Ping Ying, Bellevue, WA (US)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/609,441

(22) Filed: Jan. 30, 2015

(65) Prior Publication Data

US 2015/0244669 A1    Aug. 27, 2015

Related U.S. Application Data

(60) Provisional application No. 61/942,623, filed on Feb. 21, 2014.

(51) Int. Cl.
| | | |
|---|---|---|
| *G10L 15/00* | (2013.01) | |
| *H04L 12/58* | (2006.01) | |
| *G10L 15/26* | (2006.01) | |
| *G10L 13/00* | (2006.01) | |

(52) U.S. Cl.
CPC .............. *H04L 51/36* (2013.01); *G10L 13/00* (2013.01); *G10L 15/26* (2013.01); *H04L 51/066* (2013.01)

(58) Field of Classification Search
USPC ................................................. 704/200–275
See application file for complete search history.

(56) References Cited

U.S. PATENT DOCUMENTS

| | | | | |
|---|---|---|---|---|
| 2001/0029454 | A1* | 10/2001 | Yamada | G10L 13/07 704/258 |
| 2003/0074196 | A1* | 4/2003 | Kamanaka | G10L 13/07 704/260 |
| 2003/0171850 | A1* | 9/2003 | Kobayashi | G10L 13/00 700/272 |
| 2004/0034528 | A1* | 2/2004 | Sakai | H04M 3/493 704/258 |
| 2004/0215460 | A1* | 10/2004 | Cosatto | G06F 17/30905 704/260 |
| 2012/0116776 | A1* | 5/2012 | Campbell | G10L 13/033 704/270.1 |

(Continued)

FOREIGN PATENT DOCUMENTS

| | | |
|---|---|---|
| CN | 101378530 | 3/2009 |
| CN | 102821196 | 12/2012 |

OTHER PUBLICATIONS

"Office Action of China Counterpart Application", issued on Mar. 1, 2017, pp. 1-9.

*Primary Examiner* — Jesse Pullias
(74) *Attorney, Agent, or Firm* — Jianq Chyun IP Office

(57) ABSTRACT

The disclosure proposes a smart conversation method and an electronic device using the same method. According to one of the exemplary embodiments, an electronic device may receive via a receiver a first communication in a first communication type and determining a recipient status. The electronic device may determine a second communication type as an optimal communication type based on the recipient status. The electronic device may convert the first communication into a second communication that is suitable for the second communication type. The electronic device may transmit via a transmitter the second communication in the second communication type.

15 Claims, 4 Drawing Sheets

(56) References Cited

U.S. PATENT DOCUMENTS

2012/0289217 A1* 11/2012 Riemer ............ H04M 1/72577
   455/418
2013/0304457 A1* 11/2013 Kang ...................... G10L 13/00
   704/201

* cited by examiner

SMART CONVERSATION METHOD AND ELECTRONIC DEVICE USING THE SAME

CROSS REFERENCE TO RELATED APPLICATION

This application claims the priority benefit of U.S. provisional application Ser. No. 61/942,623, filed on Feb. 21, 2014. The entirety of the above-mentioned patent application is hereby incorporated by reference herein and made a part of specification.

TECHNICAL FIELD

The disclosure is directed to a smart conversation method and an electronic device using the same method.

BACKGROUND

Small Communication devices such as a smartphone could provide a plethora of means to allow users of smartphones to conduct communications, ranging from a conventional phone call to more modern means such as text messaging, instant messaging, conducting a voice over IP (VoIP) conversation, and etc. A communication with a modern electronic device could be demarcated into at least one of these following types: a Circuit-Switched (CS) voice call, a Short Messaging Service (SMS), an Instant Messaging (IM) (e.g. ICQ, AOL, MSN messenger, Line, etc. . . . ), a VoIP voice call (e.g. a call using proprietary software such as Line or Skype), and a Video call.

Although store-and-forward conversations such as SMS and IM based conversations could be considered less intrusive, most real time conversations such as a CS voice call, a VoIP call, or a video call could be considered intrusive. For instance, an above-mentioned real time conversation could be intrusive when a recipient at the time of receiving a call requires undivided attention such as driving a motor vehicle or operating heavy machinery. Similarly, a recipient may find one's self under a circumstance when it would be inappropriate to engage in a real time conversation, such as when the recipient is in a meeting, in a movie theater, in a doctor appointment, a date, and so forth. Also, a recipient might be under a circumstance when the recipient is not in a position to receive a communication at all, such as when the recipient is sleeping, at a dentist chair, under anesthetics, and so like. Under these unfortunate circumstances, important calls could be missed or delayed due to inability or unwillingness to engage conversations in real time.

Moreover, a recipient may prefer a different (above-mentioned) type of conversation other than what an initiator of the conversation uses. For example, when a caller makes a call to a called party, the call could be a CS voice call type of conversation that is initiated by dialing from a phone call interface, and the called party would need to receive the phone call from a phone call user interface (UI) to service the CS voice call. In other words, the electronic device of the called party does not actually have the option to use a UI which services a different type of communication in real time or to answer the CS call directly. Conventionally, a recipient may need to manually decline or not answer a CS call first and transmit a message back to the sender by user another communication mean such as an instant message. For another example, when a caller sends a text message which is a SMS type of communication to a called party, the called party would need to receive the text message from a user interface which services the SMS type of communication. In other words, the electronic device of the called party does not have the option to use a UI that services different types of communication to engage the incoming text message.

SUMMARY OF THE DISCLOSURE

Accordingly, the present disclosure is directed to a smart conversation method and an electronic device using the same method.

In one of the exemplary embodiments, the present disclosure is directed to an electronic device which includes at least but not limited to a transmitter for transmitting data; a receiver for receiving data; and a processor, electrically coupled to the transmitter and the receiver. The processor is configured at least for: receiving, via a receiver, a first communication in a first communication type and determining a recipient status; determining a second communication type as an optimal communication type based on the recipient status; converting the first communication into a second communication that is suitable for the second communication type; and transmitting, via a transmitter, the second communication in the second communication type.

In one of the exemplary embodiment, the present disclosure is directed to a smart conversation method that includes at least but not limited to receiving, via a receiver, a first communication in a first communication type and determining a recipient status; determining a second communication type as an optimal communication type based on the recipient status; converting the first communication into a second communication that is suitable for the second communication type; and transmitting, via a transmitter, the second communication in the second communication type.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
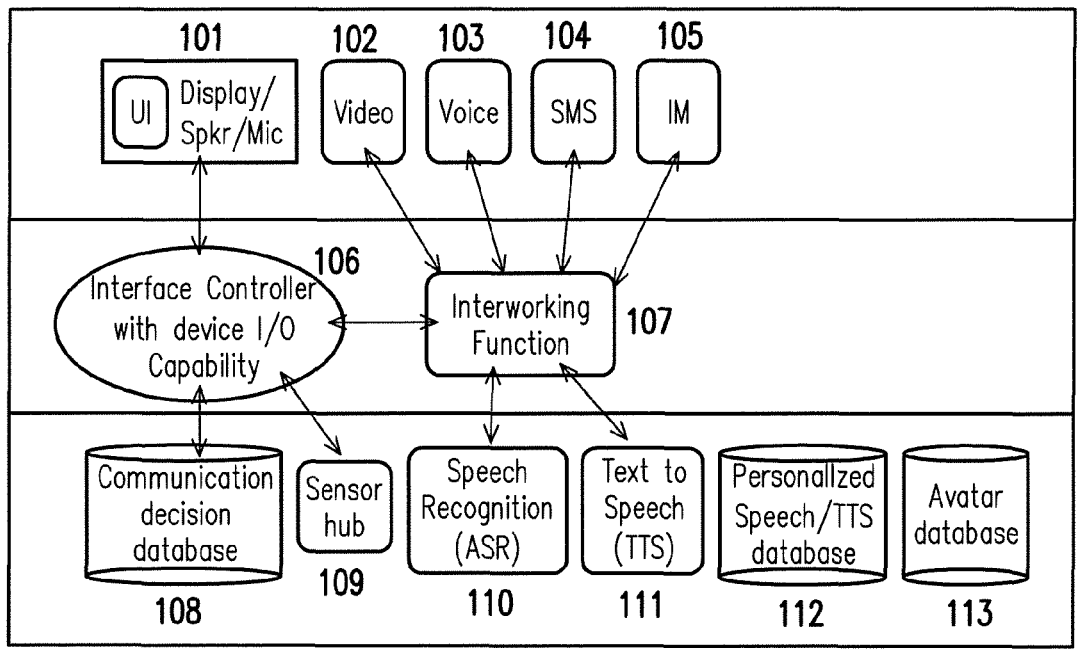
FIG. 1 is a functional block diagram that illustrates an electronic device with smart conversation capability in accordance with one of the exemplary embodiments of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

In order to solve the aforementioned problem, the disclosure proposes a smart conversation capable electronic device that provides a recipient state controlled conversation user interface (UI) on a touch screen of the mobile electronic device.

The disclosure describes a communication paradigm that allows a recipient to use a mobile electronic device to select a desired communication type when the recipient receives a communication from a send or an initiator of the communication, and the selection made by the recipient could be independent of the communication type that is used by the sender who initiated the communication. The selection of the communication type could be manual in a sense that the recipient could manually select the communication type to reply to the sender from a user interface within the mobile electronic device or by switching among different user interfaces within the mobile electronic device.

The selection of the communication type could also be automatic in a sense that the electronic device used by the recipient of an incoming communication could automatically select for the recipient an optimal communication type according to a set of parameters. The set of parameters may contain at least but not limited to a predetermined preference setting of the recipient, a readiness or a status setting of the recipient, a readiness or status detected by the electronic device, the data readings detected by a sensor (G-sensor, temperature sensor, motion sensor, infrared sensor, sound sensor, and etc.) of the mobile electronic device, the current time or date, and information or profile of the sender. Based on one parameter or a combination of different parameters, the mobile electronic device of the recipient could automatically select an optimal communication type for the recipient.

The automatic selection could be made by the mobile electronic device both before and in response to an incoming communication from a sender based on the above-mentioned set of parameters. This means that the communication type could be automatically switched while a communication is taking place. However, the communication type could also be automatically changed before or after a communication in response to the mobile electronic device have determined that at least one parameter of the set of parameters has changed and then in response have determined that another optimal communication type is more suitable because of the change of the circumstance.

By manually selecting a communication type, a mobile electronic device under one exemplary embodiment could automatically re-select another communication type during a communication. Under another exemplary embodiment, by making a manual selection, the electronic device would be prevented from making an automatic selection before and after a communication. Similarly if the mobile electronic device is configured to automatically select an optimal communication type, the recipient would not be precluded from making a manual selection.

The above-mentioned new paradigm could even be extended beyond a one on one conversation to a one to many conversation or many to many conversation by aggregating multiple conversation streams. Detailed embodiments of the above mentioned concept are to be described in the followings.

FIG. 1 a functional block of the paradigm of an exemplary electronic device in accordance with one of the exemplary embodiments of the present disclosure. The exemplary electronic device could be a smart phone, a desktop PC, a non-mobile device, or a network element such as a base station, a relay station, a server, a gateway, and a network controller. The exemplary electronic device may also be a wearable device such as a smart watch. Each of the functional blocks could be implemented by software or hardware or a combination of both. It would apparent for an ordinary person skilled in the art that various functional blocks of FIG. 1 could be implemented by hardware elements which are well known for a mobile electronic device such as a microprocessor, a controller, communication interfaces, transceivers, sensors, display, and so forth.

The functional blocks contain at least but not limited to an input/output interface 101 that may include elements at least such as a display, a speaker, a microphone, and so forth. The functional blocks would also contain various communication resources including video 102, voice 103, SMS 104, and IM 105. The implementation of the video resource 102 may involve a video camera and a speaker, the voice resource 103 may involve a microphone and a speaker, and the implementation of the SMS resource 104 and the IM resource 105 may involve a real or virtual keyboard. These communication resources could be transmitted or received via a transmitter or a receiver. These communication resources could be stored in a non-volatile or volatile memory or directly received from a buffer. These communication resources could also be stored in at a location such as a cloud server which is not native to a communication device.

The functional blocks also contain an interworking function 107, an automatic speech recognition (ASR) engine 110, a text to speech (TTS) engine 111, a personalized speech/TTS database 112, and an avatar database 113. The ASR engine 110 would convert from a digitized speech as an input into text. The digitized speech and the converted text are not limited to any particular language. The TTS engine 111 would receive a text as an input and convert the text into a synthesized speech as an output. The personalized speech/TTS database 112 is electrically coupled to the TTS engine 111 and would be a database which contains personal preferences as for how to convert text into speech or speech into text. For example, the personalized speech database may include speech model files of known callers that can be used to improve recognition rate of the incoming voice whereas the personalized TTS database may include speech model files which simulate sender's vocal trait and speech pitch/cadence or give a particular type of voice (e.g. masculine, feminine, high pitched, low pitched, and etc.). The avatar database 113 would contain avatars of contacts represented by a still image or a motion image of the sender/caller that may be lip-synced to the synthesized voice (TTS). The interworking function 107 would electrically couple the automatic speech recognition (ASR) engine 110, the text to speech (TTS) engine 111, the personalized speech/TTS database 112, and the avatar database 113 with the communication resources 102, 103, 104, and 105.

The interworking function 107 would serve as a logical and connective medium during a conversion process as a first content of one communication type is converted into a second content of another communication type. The interworking function 107 could be implemented by a microprocessor or a microcontroller. For example, the video resource 102 could be a sender video stored in a local hard disk, and the sender video could be received from the input/output interface 101 in real time, and the interwork function 107 would then receive the sender video and then deliver the sender video to the ASR engine 110. The ASR engine would extract the speech from the sender video to be converted into text. Similarly, the texts received from the SMS resource 104 and the IM resource 108 could be converted into a real time speech through the interworking function 107.

The functional blocks of FIG. 1 would further contain at least but not limited to an interface controller 106, a communication decision database 108, and a sensor hub 109. The interface controller would be electrically coupled to the input/output interface 101, the interworking function 107, the communication decision database, and the sensor hub 109. The interface controller 106 may possess a with device I/O capability The sensor hub would include one or more sensors such as G-sensor, temperature sensor, motion sensor, infrared sensor, pressure sensor, and so forth. The communication decision database 108 would contain predetermined preference settings of a user, and the predetermined preference settings could be incorporated along with output from the sensor hub 109, the time information, and the calendar information to be used by the interface controller 106 to determine an optimal communication type. When the optimal communication type has been determined, the interface controller 106 could then coordinate through the interworking function 107 to convert an input from one communication type into another communication type.

Figure 2:
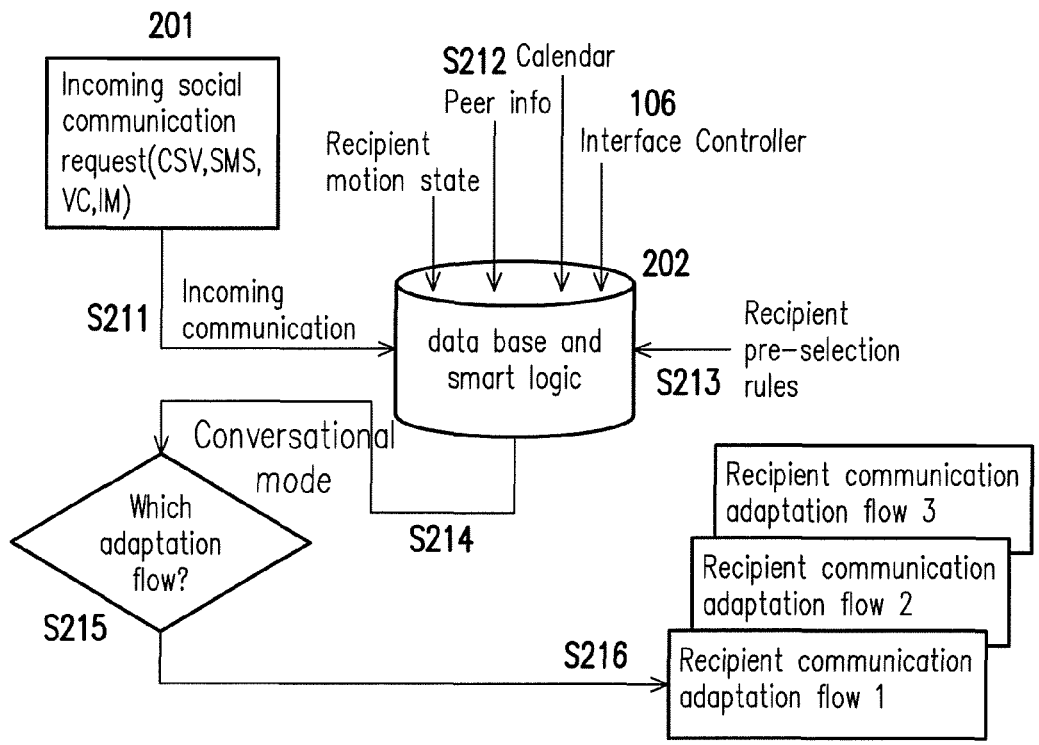
FIG. 2 is a flow chart that illustrates a smart conversation method in accordance with one of the exemplary embodiments of the present disclosure.

The disclosure also provides a smart conversation method that is applicable to an electronic device. FIG. 2 is a flow chart which illustrates a proposed smart conversation method when there is an incoming social communication request (e.g. CS voice call, VoIP call, video call, IM, SMS, and so forth). The flow chart of FIG. 2 could, for example, be implemented by at least but not limited to the interface controller 106 of FIG. 1.

The smart conversation method would receive an incoming social communication request 201 to be converted by a database and smart logic 202 circuit into an output (not shown) of a different communication type as the result of steps S211~S216. In step S211, the interface controller 106 could be used to determine the communication type of the request which could be received from the input/output interface 101 in real time or could be data already stored locally or in a cloud storage. In response to step S211, the database and smart logic 202 would determine an optimal communication type for the device receiving the communication request. In S212, the database and smart logic 202 would obtain parameters such as the motion state of the recipient through the sensor hub 109, the peer information of the initiator of the request 201, the calendar information, and a signaling input from the interface controller 106. The signaling input from the interface controller 106 could be used to indicate an I/O interface availability on this overall device. The interface controller 106 can thus inform the database and smart logic 202 what methods of conversation the device is capable of providing to user before an optimal conversation mode can be determined from other inputs.

One of more of these parameters could already be stored within the database and smart logic 202 or have to be obtained externally. For example, the readings from the sensor hub 109 might indicate that the recipient is experiencing high motion and thus would not be in the situation most suitable to perform text messaging. The calendar information may indicate that the recipient might be currently in a meeting. The peer information may indicate that the initiator of the request 201 is not a good partner to engage in a real conversation. In step S213, the database and smart logic 202 would obtain a predetermined preference of the recipient, and the predetermined preference may contain a set of rules such as the time or date that certain communication types should be used, certain communication types that would be appropriate for certain peers, and etc. Based on the parameters collected as the result of steps S212 and S213 which do not have to be performed in any particular order, the database and smart logic 202 in step S214 would determine an optimal communicate type.

In step S215, the interface controller 106 would perform the subsequent conversion from one communication type into another communication type if deemed necessary. When the optimal communication type is the same as the communication type of the initiator of the request 201, then no conversion is necessary. Also, the database and smart logic 202 may take the information received from the signaling indicator that indicates an I/O interface availability on this overall device in order to determine the recipient communication adaption flow of the step S216. Otherwise, in step S216, a conversion between two different communication types will be made by the interworking function to generate a communication adaptation flow. For example, in step S216, if the request 201 is in the form of a video call, then the recipient communication adaptation flow 1, 2, and 3 could be a CS voice call/VoIP voice call, a text message, or an instant message respectively. The decision of the recipient communication adaption flow back in step S215 could be based on the I/O interface availability indicator. For example, if only the CS voice call/VoIP voice call is available, then the recipient communication adaptation flow 1 would be selected. To elucidate FIG. 1 and FIG. 2 in further details, the disclosure provides four exemplary embodiments to be shown by FIG. 3~FIG. 6 which are to be described as follows.

Figure 3:
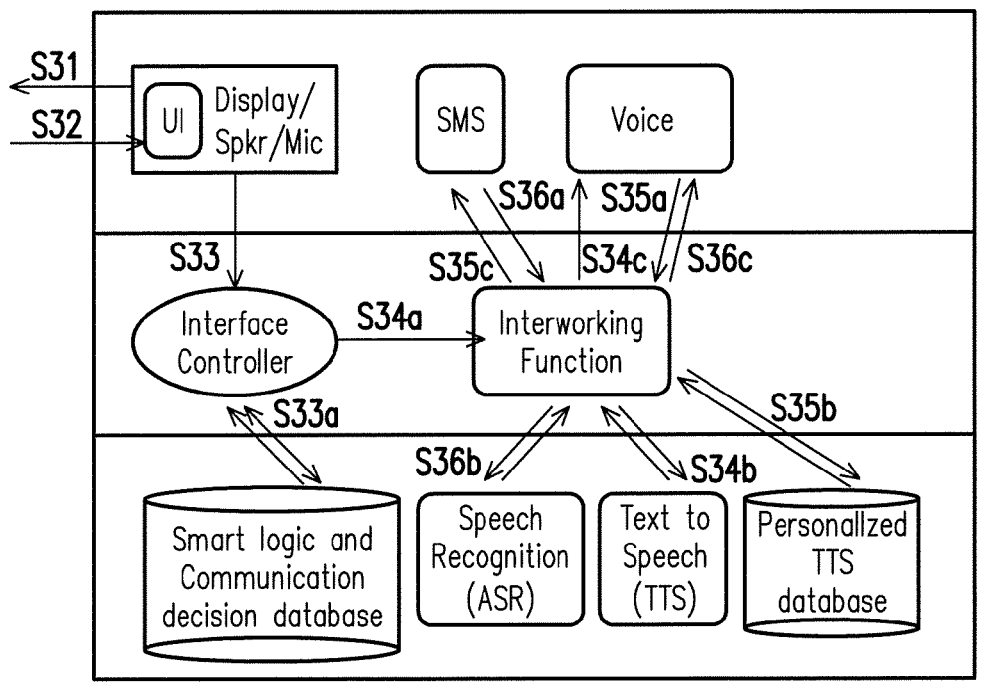
FIG. 3 illustrates a first exemplary embodiment in accordance with one of the exemplary embodiments of the present disclosure.

FIG. 3 illustrates a first embodiment as a hypothetical scenario in which a recipient finds oneself in a meeting upon receiving a CS voice call but decides to use a SMS interface to engage in the conversation. In step S31, the recipient is notified by a CS voice alert from the input/output interface 101 (e.g. a speaker) that an incoming CS voice call is coming. In step S32, the recipient manually selects from a UI to reply the incoming CS voice call with texts, which could be for example, "hello?". It should be noted that the recipient could choose to receive the CS voice call in the form of a voice call or in the form of a text message. For example, if the recipient is in a meeting, the recipient could listen to the voice call by using a headphone or could from a display the text converted from the CS voice call. But in this example, the recipient chooses to hear the CS voice call in the form of texts. In step S33, the interface controller 106 receives the CS voice call and coordinates with the interworking function 107 that is involved with the subsequent communication type conversion. In step S34a, in response to the recipient answering the CS voice call by sending texts, the interface controller 106 would coordinate with the interworking function 107 to convert from the text communication type into the voice communication type. In step S34b, the text would be converted into a synthesized speech by the TTS engine 111 according to the preference settings stored in the personalized TTS database 112. In step S34c, the synthesized speech "hello?" would be delivered by the interworking function 107 to the voice resource 103 which could be a storage buffer temporarily allocated for voice data. The synthesized speech would eventually be transmitted through a wireless interface (not shown) to the initiator (John) of the CS voice call.

Assuming that in response to receiving the "hello?" from the recipient, John speaks a sentence to the recipient, and the sentence is digitized. In step S35a, the digitized sentence is stored in the voice resource 103 and delivered to the interworking function 107 to be converted. In step S35b, the digitized sentence is delivered to the ASR engine 110 to be recognized. The ASR engine 110 could either be native to the recipient's mobile electronic device or is external to the device. In that case, the digitized sentence would be transmitted through the wireless interface to an external location. After the conversion from the digitized sentence into a text has been complete, in step S35c, the text would delivered to the SMS resource 104 in order to be displayed by the input/output interface 101 (e.g. the display). In step S36a, the recipient types a digitized reply. In step S36b, the digitized reply is delivered to the TTS engine 111 and is converted into speech reply. In step S36c, the speech reply is delivered to John through the interworking function 107 under the coordination of the interface controller 106.

According to a first alternative embodiment of FIG. 3, in step S32, instead of manually selecting a SMS interface to make a reply, the interface controller 106 could automatically make the selection for the recipient instead. The selection process could be based on a process similar to FIG. 2. For example, interface controller 106 could implement the database and selection logic 202 or receive a determination from the database and selection logic 202 external to the interface controller that the most optimal communication type for the recipient would be the text message type. The determination could be made based on information from the calendar application which indicates that the recipient at this time could very likely be in a meeting. Therefore, the difference between the first alternative embodiment and the first alternative embodiment is that the optimal communication type is automatically determined rather than manually determined.

According to a second alternative embodiment of FIG. 3, the optimal communication type is not only automatically determined but could dynamically change before, during, and after a conversation. In particular, in step S33a, the interface controller that may possess a device I/O capability may interact with the Smart logic and communication decision database to determine whether to dynamically change the optimal communication type. For example, suppose that during a middle of a voice conversation between a caller and a called party, the database and smart logic 202 could determine that called party would suddenly not be in a position to keep having a voice conversation. In that case, the smart logic 202 would automatically enable the interface controller 106 to coordinate with the interworking function 107 to implement steps S35a, S35b, S35c, S36a, S36b, and S36c.

Figure 4:
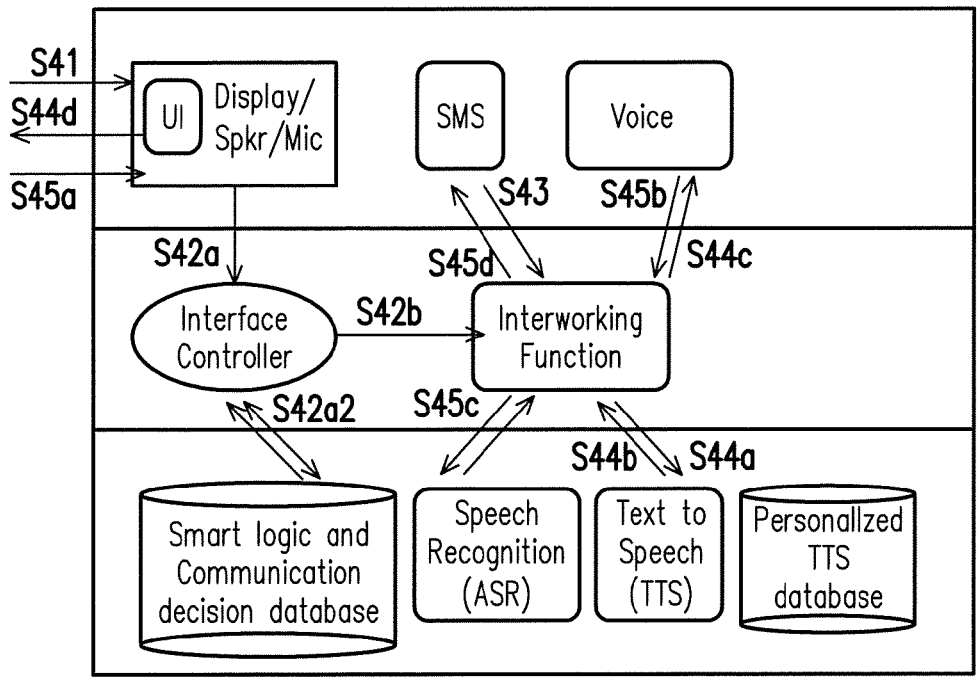
FIG. 4 illustrates a second exemplary embodiment in accordance with one of the exemplary embodiments of the present disclosure.

FIG. 4 illustrates a second exemplary embodiment as a scenario in which a recipient is driving and has manually selected to reply to all conversations with a voice-only interface regardless of the incoming communication types. In step S41, the recipient has manually predetermined to use a voice interface to engage in all conversations while the recipient is driver, since the recipient would be considered to be not in a good situation to engage in text messaging while the recipient is driving.

Assuming that the recipient has received a SMS message, in step S42a, the interface controller 106 has known of the recipient's decision and thus in step S42b coordinates with the interworking function 107 to translate between the SMS message communication type and the voice communication type. In step S43, the interwork function 107 obtains the SMS text message from a sender (John). In step S44a, the interworking function delivers the SMS text message to the TTS engine 111, and the TTS engine 111 generates a synthesized incoming speech from the SMS text message from John (TTS database may contain John's speech model which allows TTS engine to synthesize the speech with John's voice). In step S44b, the synthesized incoming speech is delivered to the interworking function 107. In step S44c, the synthesized incoming speech is delivered to the voice resource 103 which could be a voice out storage buffer containing the synthesized speech to be delivered to a speaker. Additionally, the synthesized voice would be tagged with a preamble which would audibly indicate that the synthesized incoming speech is from John. After the recipient hears John's SMS message in the form of the synthesized speech, in step S45a, the recipient would say the reply into a microphone of the input/output interface 101, and the reply would be digitized into a digitized reply. In step S45b, the digitized reply would in the voice resource 103 to be delivered to the ASR engine 110 through the interworking function 107. In step S45c, the ASR engine would recognize the digitized reply and generate a corresponding text message that would be delivered to John. The text message could either be a SMS message or an IM.

According to a first alternative embodiment of FIG. 4, similar to the a first alternative embodiment of FIG. 3, instead of manually predetermining to use the voice interface while driving, the database and smart logic 202 could automatically determine that the recipient is not in a position to perform text messaging. It could be determined based on, for example, the past behavior of the recipient, calendar information which suggests that the recipient needs to be in two places in a short amount of time, and sensor readings from the sensor hub 109. When the smart logic 202 has determined that the recipient is not in a position to perform text messaging, steps S42a~45c could then be performed.

According to a second alternative embodiment of FIG. 4, similar to the first alternative embodiment of FIG. 3, the optimal communication type is not only automatically determined but could dynamically be changed before, during, and after a conversation. In particular, in step S42a2, the interface controller that may possess a device I/O capability may interact with the Smart logic and communication decision database to determine whether to dynamically change the optimal communication type. For example, suppose that during a middle of a voice conversation between a caller and a called party, the database and smart logic 202 could determine that called party would suddenly not be in a position to engage in a voice conversation any longer but could actually engage in a text message conversation instead. In that case, similar to FIG. 3 the smart logic 202 would automatically enable the interface controller 106 to coordinate with the interworking function 107 to implement steps similar to steps S35a, S35b, S35c, S36a, S36b, and S36c described previously for FIG. 3.

Figure 5:
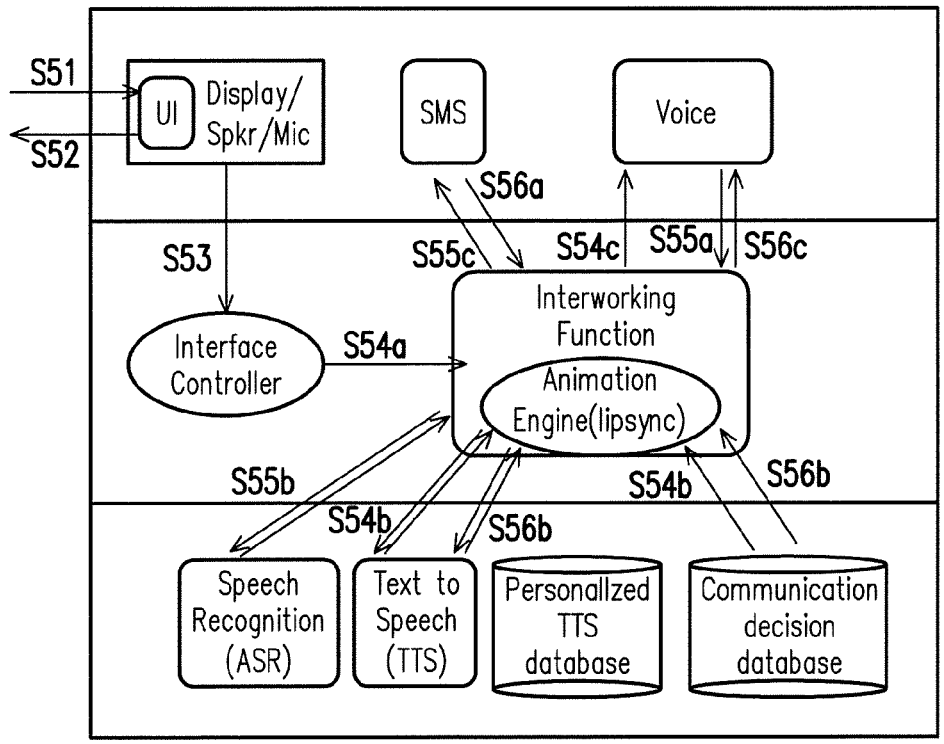
FIG. 5 illustrates a third exemplary embodiment in accordance with one of the exemplary embodiments of the present disclosure.

FIG. 5 illustrates a third exemplary embodiment as an implementation of FIG. 2 when a packet switch (PS) based video call is received while a recipient is in a meeting and unable to answer the video call but decides to use a SMS interface to answer the video call instead. In this case, an animated personal avatar along with the personalized TTS will be delivered to the caller as a video call.

In step S51, the recipient has received a video call from an initiator (John) of the video call. In step S52, the recipient has manually selected to use a SMS interface to reply to the video call. In step S53, the decision to use the SMS interface to reply to the video call is received by the interface controller. In step S54a, the interface controller 106 would coordinate conversation process from one communication type to another communication type through the interworking function 107. In step S54b, the interworking function 107 could deliver a text message that has been typed by the recipient to be delivered to John, and the TTS engine would convert the text message into a synthesized speech to be delivered to John. The synthesized speech would be delivered by the TTS engine to the animation engine. Also at about the same time when the animation engine receives the synthesized speech, the avatar database 113 would provide an animation to represent the recipient to the animation engine, and the mouth of the animated figure would lip sync with the synthesize speech to be delivered to John. The synthesize speech could be customized according to the recipient's preference settings of the TTS database. At the conclusion of the step S54b, the animation engine would have received the synthesized speech and the animation to represent the recipient and would in response generate the corresponding video to be delivered to the video resource. In step S54c, the animation according to the avatar 113 lip-synchronized with the synthesized speech of the TTS engine would be delivered by the animation engine which is electrically coupled to the interworking function 107 to the video resource 102 as the animation will be delivered to John over the wireless interface. In step S55a, video from John would be delivered through the interworking function 107 to the ASR engine 110. The ASR engine 110 would extract the audio portion of the video from John and convert the audio portion into text. In step S55c, the text message would be delivered to the SMS resource 104 to be shown to the recipient in the display of the input/output interface 101. In step S56a, the recipient reply to John by typing a reply message. In step S56b, the text message would be delivered through the interworking function 107 to the TTS engine 111. The TTS engine 111 along with the personalize TTS database would in turn generate a next synthesized speech that corresponds to the reply message. Also at about the same time when the synthesized speech that corresponds to the reply message has been received by the animation engine, in step S56b, the animation engine would receive from the avatar database a next generated animation lip-synchronized with the next synthesized speech. In step S56c, the next generated animation would be delivered to the video resource 102 to be sent out to John over the wireless interface.

Figure 6:
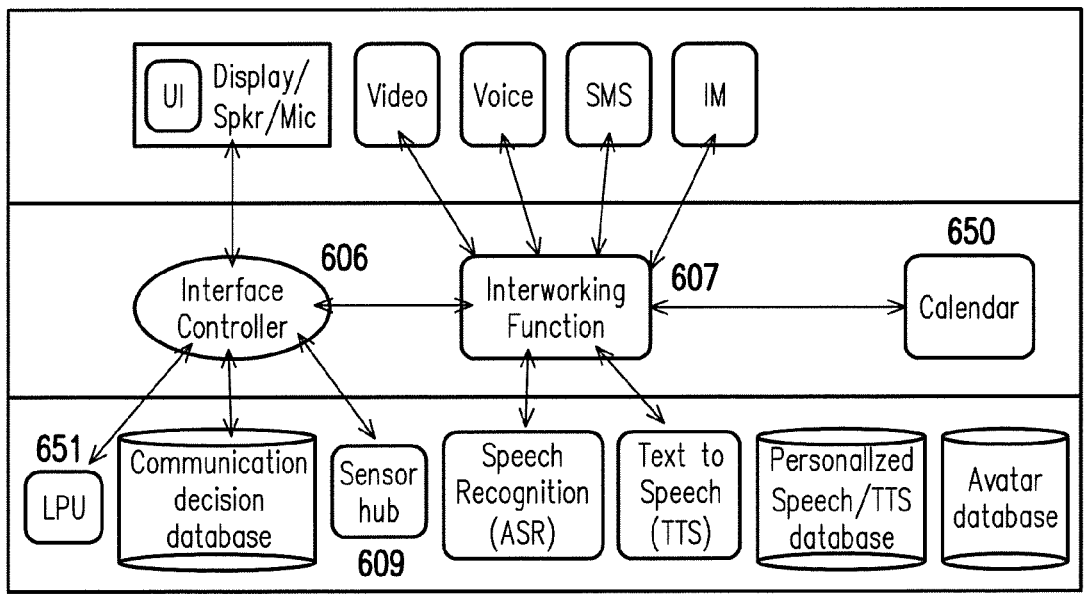
FIG. 6 illustrates a fourth exemplary embodiment in accordance with one of the exemplary embodiments of the present disclosure.

FIG. 6 illustrates a fourth exemplary embodiment in accordance with one of the exemplary embodiments of the present disclosure. The fourth exemplary embodiment utilizes not only a first application to determine the optimal communication type but also utilizes a second to make dynamic determination as for whether the optimal communication type should be changed. The first application, for example, could be a calendar application that is used to determine the current circumstance of a user, and the second application could be, for example, a location and positioning unit (LPU) that is used to determine the location of a user in terms of a longitudinal and latitudinal coordinate, or an address on a map, or proximity to a known reference point and to determine whether the user has moved or a location where certain conversational modes are preferred. The location and positioning unit could be, for example, a GPS receiver, a RF signature calculator, a WiFi, a sensor, an observed time different of arrival (OTDOA) based calculator, and so forth.

For example, the smart conversation method used by an electronic device described in fourth exemplary embodiment could operate as follows. The interworking function 607 may determine the status of a user via another application. For example, the interworking function 607 may predict the status of a user from a calendar application 650. Based on the record of the calendar application 650, for example, the interworking function 607 may determine that the user is currently in a meeting so that the interworking function 607 may automatically convert an incoming call from voice to text by using an ASR engine 110, and the user may respond in synthetic speech after the interworking function 607 uses the text to speech (TTS) 111 to convert from text into speech. In general, based on the current status of a user, the interworking function 607 may convert a first communication data received via a first communication type into a second communication data suitable for a second communication type. The interworking function 607 may also respond by converting a third communication data suitable for the second communication type or another communication type into a fourth communication data to be transmitted via the first communication type or another communication type.

However, it is conceivable that the meeting could be over before the ending time recorded in the calendar application 650, or the user might choose to walk out of the meet while the meet is still in session. For the fourth exemplary embodiment, the interworking function 607 may periodically update the status of the user. For example, the interworking function 607 may periodically determine the location of the user from the location and positioning unit 651 via the interface controller 606. Based on the user location, if the interworking function 607 has determined that the user is very likely to be no longer in the meeting, the interworking function may switch the current communication type to a different communication type. In this case, the interworking function 607 may stop converting an incoming voice call into text but instead allow the user to engage in a voice conversation normally.

However, assuming that the user has walked out of the meeting to go into a movie theater where talking would be considered inappropriate. Upon the location and positioning unit 651 determining that the user is in a movie theater based on a map stored in the electronic device or in the cloud storage outside of the electronic device, the interworking function 107 may switch the communication type to a text based communication type or to a text to speech communication type.

For another example of the fourth exemplary embodiment, assuming that the electronic device with smart conversation capability is a wearable device such as a smart watch, the wearable device may also discern or predict the status of the first user in order to determine whether to switch the first user from engaging, with a second user, a communication in a first communication type into engaging the communication in a second communication type which could be different from what the second user is using to communicate with the first user in real time. The second user could actually be communicating with the first user by using the first communication type or a third communication type. For example, the first communication type could be a typical voice conversation, and the second communication type could be text messaging or instant messaging.

If the interworking function 607 has determined from the calendar application 605 or from a motion sensor or G sensor in the sensor hub 609 via the interface controller 606 that the first user is playing sports, the interworking function 607 may let the first user to engaging in a communication by using the voice call (i.e. through the voice resource 103) regardless of the communication type of the second user since the first user might not be in the position to type but could instead talk into the speaker 101 of the wearable device. However, when the interworking function 607 has determined that the user is in an intermission from the calendar application 605 or could be taking a break from sensor readings of the sensor hub 609 via the interface controller 606, the interworking function 607 may switch the communication type for the first user into a text to voice conversation or text to text conversation (e.g. IM, SMS). The setting of the communication type of the first user could be manually selected by the first user, and the current status of the first user could also be manually set by the first user in real time or in advance.

Figure 7:
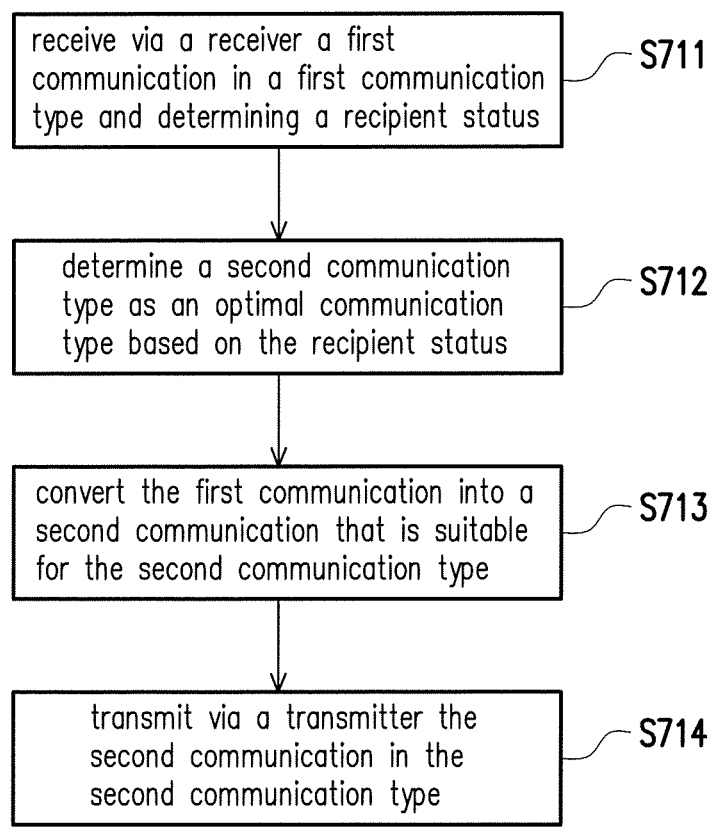
FIG. 7 is a flow chart that illustrates a smart conversation method in accordance with one of the exemplary embodiments of the present disclosure.

FIG. 7 is a flow chart that illustrates a proposed a smart conversation method in accordance with one of the exemplary embodiments of the present disclosure. In step S701, an electronic device may receive via a receiver a first communication in a first communication type and determining a recipient status. In step S702, an electronic device may determine a second communication type as an optimal communication type based on the recipient status. In step S703, an electronic device may convert the first communication into a second communication that is suitable for the second communication type. In step S704, an electronic device may transmit via a transmitter the second communication in the second communication type.

In view of the aforementioned descriptions, the present disclosure is suitable for being used by an electronic device to allow a user to communicate with another user by using the optimal communication type that is most suitable for the situation of the user. The determination of the optimal communication type could be made manually or automatically, and adjustments of the optimal communication type could be dynamic when the situation of the user changes.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items" and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A smart conversation method applicable to an electronic device comprising:
receiving, via a receiver, a first communication in a first communication type and determining a recipient status of a recipient, wherein the recipient receives the first communication from a send or an initiator of the first communication;
determining a second communication, different from the first communication type, as an optimal communication type based on at least the recipient status;
converting the first communication into a second communication that is suitable for the second communication type which is the optimal communication type;
transmitting, via a transmitter, the second communication in the second communication type;
transmitting, via the transmitter, a third communication in a third communication type or in the first communication type in response to detecting the recipient status of the recipient has changed,
wherein the recipient status is determined according to at least a scheduling information or updated periodically according to a sensor reading or a GPS reading,
wherein a communication type without typing is selected in response to detecting the recipient status of the recipient has changed because of user motion.

2. The method of claim 1, wherein in response to detecting the recipient status of the recipient has changed, switching the optimal communication type back to the first communication type.

3. The method of claim 1 further comprising selecting a communication type without speaking in response to detecting the recipient status of the recipient has changed to a location or an event where speaking is determined to be inappropriate.

4. The method of claim 1, wherein the recipient status is determined according to at least one or a combination of a motion state, a predetermined setting, and scheduling information.

5. The method of claim 4, wherein the optimal communication is determined according to at least one or a combination of the recipient device I/O interface capabilities, recipient status, selection rules, a user profile, a peer information, a calendar information, a user list, a time of day, and a dynamic information from a sensor reading.

6. The method of claim 1, wherein converting the first communication into the second communication comprising:
converting a voice data into a text data by using automatic speech recognition (ASR) system; or
synthesizing a speech data from the text data by using a text to speech (TTS) synthesizer.

7. The method of claim 6, wherein the speech data is synthesized according to a personalized speech or TTS database and an avatar database.

8. An electronic device comprising:
a sensor;
a GPS system;
a transmitter for transmitting data;
a receiver for receiving data; and
a processor, electrically coupled to the transmitter and the receiver, is configured at least for:
  receiving, via a receiver, a first communication in a first communication type and determining a recipient status of a recipient, wherein the recipient receives the first communication from a send or an initiator of the first communication;
  determining a second communication type as an optimal communication type based on the recipient status;
  converting the first communication into a second communication that is suitable for the second communication type;
  transmitting, via a transmitter, the second communication in the second communication type;
  transmitting, via the transmitter, a third communication in a third communication type or in the first communication type in response to detecting the recipient status of the recipient has changed,
wherein the processor determines the recipient status according to at least a scheduling information or updated periodically according to a sensor reading of the sensor or a GPS reading of the GPS system
wherein a communication type that does not require typing is selected in response to detecting the recipient status of the recipient has changed because of user motion from the sensor reading.

9. The device of claim 8, wherein the processor is further configured for switching the optimal communication type back to the first communication type in response to detecting the recipient status of the recipient has changed.

10. The device of claim 8, wherein the processor is further configured for selecting a communication type that does not require speaking in response to detecting the recipient status of the recipient has changed via the sensor or GPS system to a location or an event where speaking is determined to be inappropriate.

11. The device of claim 8, wherein the recipient status is determined by the processor according to at least one or a combination of a motion state detected by the sensor, a predetermined setting, and scheduling information.

12. The device of claim 11, wherein the optimal communication is determined by the processor according to at least one or a combination of the recipient device I/O interface capabilities, recipient status, selection rules, a user profile, a peer information, a calendar information, a user list, a time of day, and a dynamic information from a sensor reading.

13. The device of claim 8, wherein the processor is configured for converting the first communication into the second communication comprising:
  converting a voice data into a text data through an automatic speech recognition (ASR) system; or
  synthesizing a speech data from the text data through a text to speech (TTS) synthesizer.

14. The device of claim 13, wherein the processor is configured for synthesizing the speech data according to a personalized speech or TTS database and an avatar database.

15. The device of claim 14, wherein the personalized speech model or TTS database comprises a pre-established personalized speech model or TTS databased of a caller.

* * * * *